(12) United States Patent
Bulut et al.

(10) Patent No.: US 11,727,020 B2
(45) Date of Patent: Aug. 15, 2023

(54) ARTIFICIAL INTELLIGENCE BASED PROBLEM DESCRIPTIONS

(71) Applicant: International Business Machines Corporation, Armonk, NY (US)

(72) Inventors: Muhammed Fatih Bulut, New York, NY (US); Hongtan Sun, Armonk, NY (US); Pritpal Arora, Bangalore (IN); Klaus Koenig, Essenheim (DE); Naga A. Ayachitula, Elmsford, NY (US); Jonathan Richard Young, Guildford (GB); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 782 days.

(21) Appl. No.: 16/157,740

(22) Filed: Oct. 11, 2018

(65) Prior Publication Data

US 2020/0117739 A1    Apr. 16, 2020

(51) Int. Cl.
*G06N 3/08*    (2023.01)
*G06N 3/042*    (2023.01)
(Continued)

(52) U.S. Cl.
CPC ......... *G06F 16/2465* (2019.01); *G06N 3/042* (2023.01); *G06N 3/044* (2023.01); *G06N 3/08* (2013.01); *G06Q 30/016* (2013.01)

(58) Field of Classification Search
CPC ...... G06N 3/0445; G06N 3/0427; G06N 3/08; G06Q 30/016
See application file for complete search history.

(56) References Cited

U.S. PATENT DOCUMENTS 5,581,663 A    12/1996 Zlotin
6,044,356 A    3/2000 Murthy et al.
(Continued)

FOREIGN PATENT DOCUMENTS

EP    2801942 A1 * 11/2014    .......... G06F 3/0635
EP    3321824 A1 * 5/2018    .......... G06F 16/437
WO    2017144432    8/2017

OTHER PUBLICATIONS

Zhang et al. (Automated IT System Failure Prediction: A Deep Learning Approach, Dec. 2016, pp. 1291-1300) (Year: 2016).*
(Continued)

*Primary Examiner* — George Giroux
(74) *Attorney, Agent, or Firm* — Amin, Turocy & Watson, LLP

(57) ABSTRACT

Techniques regarding providing artificial intelligence problem descriptions are provided. For example, one or more embodiments described herein can comprise a system, which can comprise a memory that can store computer executable components. The system can also comprise a processor, operably coupled to the memory, and that can execute the computer executable components stored in the memory. The computer executable components can include, at least: a query component that generates key performance indicators from a query, determines a subset of key performance indicators that individually have a performance below a threshold, and maps the subset of key performance indicators to operational metrics; a learning component that generates, using artificial intelligence, problem descriptions from one or more of the subset of key performance indicators or the operational metrics and transmits the problem descriptions to a database.

22 Claims, 9 Drawing Sheets

(51) Int. Cl.
G06Q 30/016 (2023.01)
G06F 16/2458 (2019.01)
G06N 3/044 (2023.01)

(56) References Cited

U.S. PATENT DOCUMENTS

| | | | |
|---|---|---|---|
| 7,454,391 B2 | 11/2008 | Zhang | |
| 7,536,368 B2 | 5/2009 | Todhunter | |
| 8,209,218 B1* | 6/2012 | Basu | G06Q 10/0637 |
| | | | 705/7.39 |
| 9,043,793 B1 | 5/2015 | Field et al. | |
| 11,004,005 B1* | 5/2021 | Sirois | G06N 5/045 |
| 2006/0143115 A1 | 6/2006 | Eder | |
| 2006/0206287 A1* | 9/2006 | Rosam | G06Q 10/10 |
| | | | 702/182 |
| 2007/0027593 A1* | 2/2007 | Shah | B60W 50/00 |
| | | | 702/33 |
| 2007/0279490 A1* | 12/2007 | Zhou | G06K 9/00771 |
| | | | 348/143 |
| 2008/0126831 A1* | 5/2008 | Downey | H04L 69/40 |
| | | | 714/4.2 |
| 2011/0004419 A1* | 1/2011 | Ue | G05B 23/0254 |
| | | | 702/34 |
| 2012/0131172 A1 | 5/2012 | Falk et al. | |
| 2013/0173353 A1* | 7/2013 | Kamath | G06Q 10/04 |
| | | | 705/7.39 |
| 2014/0163936 A1* | 6/2014 | Hosking | G06Q 10/0635 |
| | | | 703/2 |
| 2014/0181306 A1 | 6/2014 | Kothamasu et al. | |
| 2016/0092803 A1* | 3/2016 | Boyacigiller | G06F 16/00 |
| | | | 705/7.27 |
| 2016/0103559 A1* | 4/2016 | Maheshwari | G06F 3/0481 |
| | | | 715/738 |
| 2016/0147585 A1 | 5/2016 | Konig et al. | |
| 2016/0357859 A1* | 12/2016 | Agarwal | G06F 40/279 |
| 2017/0085446 A1 | 5/2017 | Zhong et al. | |
| 2018/0287856 A1* | 10/2018 | Whitner | H04L 41/0695 |

OTHER PUBLICATIONS

Jin et al. (Nevermind, the Problem is Already Fixed: Proactively Detecting and Troubleshooting Customer DSL Problems, Nov. 2010, pp. 1-12) (Year: 2010).*
Casas et al. (Predicting QoE in Cellular Networks using Machine Learning and in-Smartphone Measurements, Oct. 2017, pp. 1-7) (Year: 2017).*
Wu et al. (K-PdM: KPI-Oriented Machinery Deterioration Estimation Framework for Predictive Maintenance Using Cluster-Based Hidden Markov Model, Jul. 2018, pp. 41676-41687) (Year: 2018).*
Roy et al., "PerfAugur: Robust Diagnostics for Performance Anomalies in Cloud Services," IEEE 31st International Conference on Data Engineering, 2015, pp. 1167-1178, 12 pages.
Castro et al., "A Flexible Architecture for Service Management in the Cloud," IEEE Transactions on Network and Service Management, vol. 11, No. 1, Mar. 2014, pp. 116-125, 10 pages.
Vinyals et al., "Show and Tell: A Neural Image Caption Generator," arXiv:1411.4555v2 [cs.CV], Apr. 20, 2015, 9 pages.

* cited by examiner

ARTIFICIAL INTELLIGENCE BASED PROBLEM DESCRIPTIONS

BACKGROUND

One or more embodiments relate to providing problem descriptions, and more specifically, to providing problem descriptions using artificial intelligence technology.

SUMMARY

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can autonomously provide problem descriptions using artificial intelligence technology are described.

According to an embodiment, a system is provided. The system can include a memory that stores computer executable components. The system can also include a processor, operably coupled to the memory, and that can execute the computer executable components stored in the memory. The computer executable components can include: a query component that generates key performance indicators from a query, determines a subset of key performance indicators that individually have a performance below a threshold, and maps the subset of key performance indicators to operational metrics. The computer executable components can further include a learning component that generates, using artificial intelligence, problem descriptions from one or more of the subset of key performance indicators or the operational metrics and transmits the problem descriptions to a first database. The computer executable component can also include a content component that retrieves the problem descriptions from the first database, searches a second database for a recommendation based on the problem descriptions, and provides the recommendation for an entity.

According to one or more example embodiments, a computer-implemented method is provided. The computer-implemented method includes: generating, by a query component operatively coupled to a processor, key performance indicators from a query, determining a subset of key performance indicators that individually have a performance below a threshold, and mapping the subset of key performance indicators to operational metrics. The method further includes generating, by a learning component operatively coupled to the processor, using artificial intelligence, problem descriptions from one or more of the subset of key performance indicators or the operational metrics and transmitting the problem descriptions to a first database. The method includes retrieving, by a content component operatively coupled to the processor, the problem descriptions from the first database, searching a second database for a recommendation based on the problem descriptions, and providing the recommendation for an entity.

According to yet one or more example embodiments, a computer program product is provided. The computer program product can include a computer readable storage medium having program instructions embodied therewith. The program instructions can be executable by a processor to cause the processor to: generate, by the processor, key performance indicators from a query, determine a subset of key performance indicators that individually have a performance below a threshold, and map the subset of key performance indicators to operational metrics. The computer program product further generates, by the processor, using an artificial intelligence, problem descriptions from one or more of the subset of key performance indicators or the operational metrics and transmit the problem descriptions to a first database. The program also includes program instructions to retrieve, by the processor, the problem descriptions from the first database, search a second database for a recommendation based on the problem descriptions, and provide the recommendation for an entity.

DETAILED DESCRIPTION

Figure 1:
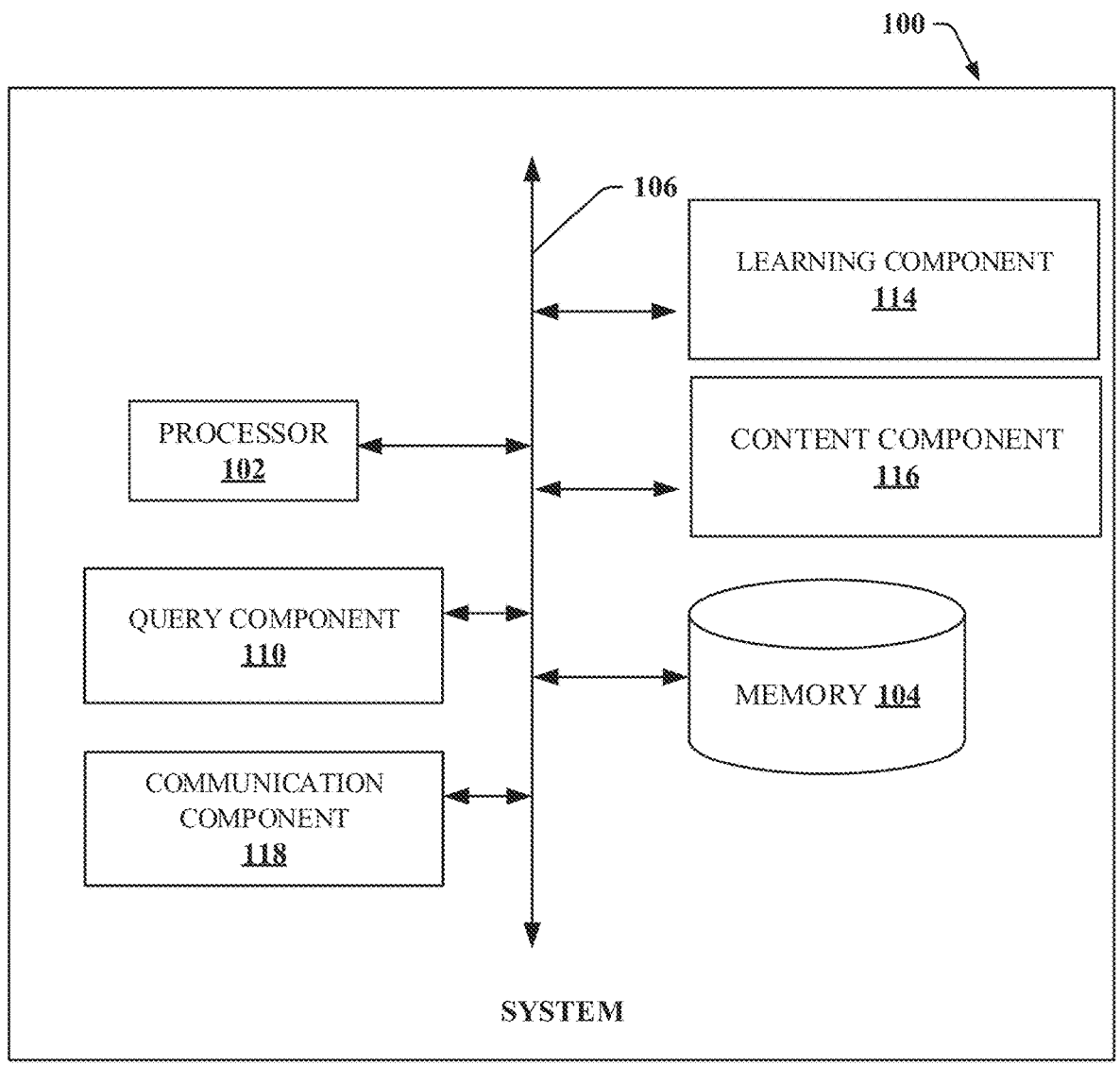
FIG. 1 depicts a block diagram of an example, non-limiting system for providing problem descriptions, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

In some aspects, the terms "class," "classification," "decision," or "recommendation" can be used interchangeably herein, unless specified otherwise.

In various embodiments, systems, methods, and apparatuses are described for automated problem description generation, for example, for use in connection with technical checks of a system under test (e.g., electronic devices and equipment). That is, embodiments of the disclosure can be used to generate a description of a possible problem associated with degradation of performance of a given system under test. Moreover, the systems, methods, and apparatuses described herein can determine and use various operational metrics and/or key performance indicators of the system under test for the automatic determination of such problem descriptions, as will be described below.

In an aspect, embodiments of the disclosure can provide automatic problem description generation for use in enterprise technical health check operations, for example, technical health check operations of large-scale enterprise systems. In various aspects, the disclosed system can react to one or more user complaints (e.g., complaints in the form of electronic messages or requests). For example, the disclosed system can react to a user complaint about a performance of a database, a server, or other components of a system under test. In another aspect, the system can react to such user complaints by dispatching a representative (e.g., an operator or maintenance individual) to visit a user site (for example, a factory, a medical facility, or other sites where the system under test is located). Such a representative can diagnose a problem with the systems according to the user's complaints. Accordingly, the representative can fix the problem and/or provide one or more recommendations for correcting the problem.

In one example embodiment, embodiments of the disclosure can provide surveys which can be sent to one or more technical architects in a predetermined time frame, for example, every 6-12 months. In another embodiment, these surveys can include various questions related to the system under test. For example, the survey can include one or more questions to be answered on various topics or domains. In another embodiment, the topics or domains can include performance parameters such as server technology performance, hardware performance, malware performance, and the like. In an embodiment, the disclosed systems can provide an operational, day-to-day data-driven approach for providing a technical health check of a system and/or various components of a system under test using artificial intelligence, as will be described herein, thereby increasing the efficiency of the system under test and/or one or more networks that the system under test is associated with (e.g., the cloud, local area networks (LANs), wide area networks (WANs), and the like).

In an aspect, embodiments of the disclosure can automatically generate problem descriptions using one or more key performance indicators that indicate when there is a reduction in the performance of the system being monitored. In an embodiment, the disclosed system can analyze a query from one or more users and classify the queries based at least in part on the key performance indicators. In another embodiment, the system can find, in real time, one or more operational metrics associated with the system under a test that can cause the particular key performance indicators to indicate poor system performance. In one embodiment, the disclosed system can generate one or more descriptions of the key performance indicators and can also use the operational metrics based on the key performance indicators in order to create a context associated with the key performance indicators and/or operational metrics. Moreover, the context can include, for example, entities, categories, or topics associated with the key performance indicators and/or operational metrics.

In an embodiment, the system can train a deep recurrent neural network (RNN) using the generated descriptions and/or context of the key performance indicators and/or the operational metrics. In one embodiment, the key performance indicators and operational metrics as well as other derived parameters can be synthesized to generate a single problem description or one or more problem descriptions, depending on the characteristics of the system under test or one or more user preferences.

In some aspects, the systems, methods, and apparatuses described herein can be operable independent of the machine-learning classification algorithm used. In other words, any suitable supervised learning classification algorithm can be used (including neural networks), making the disclosed embodiments widely deployable. For example, multiclass, multilabel machine-learning algorithms can be used and can include, but are not limited to, a support vector machine learning algorithm, a nearest-neighbor machine-learning algorithm, a deep-learning algorithm, an extreme classification algorithm, a recursive learning algorithm, a hierarchical learning algorithm, a random forest algorithm, and the like.

FIG. 1 illustrates a block diagram of an example, non-limiting system 100 for providing artificial intelligence (AI) generated recommendations along with explanations, in accordance with one or more embodiments described herein. Aspects of systems (e.g., system 100 and the like), apparatuses, and/or processes described in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks, and one or more devices (not shown). The system 100 can also include or otherwise be associated with at least one processor 102 that executes computer executable components stored in memory 104. The system 100 can further include a system bus 106 that can couple various components including, but not limited to, a query component 110, a learning component 114, and a content component 116. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication component 118 that enable communication between the system, components, models, devices, etc. over one or more networks.

In one embodiment, the query component 110 can provide contextual derivations from a user query. For example, the query component 110 can generate contextual derivations based on query analytics from one or more virtual agents associated with the enterprise system or other system under test. In another embodiment, the query component 110 can provide contextual derivations based on enterprise health control indicators and/or key performance indicators that can be determined from query analytics and can be generated in an automatic or semi-automatic manner.

In an embodiment, a content component 116 can derive, aggregate, and/or harvest information from one or more enterprise data sources in order to provide an analysis of one or more issues or problems associated with the system under test and can relate the issues to one or more enterprise health controls. In an embodiment, the content component 116, can be a self-driven component. In one aspect, the content component 116 can pull data from different sources; moreover, such data can include but not limited to incidents, tickets, changes and inventory management data. In another aspect, the collected data may be categorized, transformed, and mapped to health controls, as described further below. In another aspect, the categorization and transformation of such data may be done with AI-based algorithms (e.g. a classification algorithm to classify tickets to incident categories).

In an embodiment, the learning component 114, can capture the content and/or descriptions of the key performance indicators and/or operational metrics and can output a problem description using artificial intelligence, for example, using a deep-learning algorithm. In an embodiment, the learning component 114 can include an encoder-decoder structure associated with the artificial intelligence (for example, associated with the deep-learning algorithms such as RNNs). In an embodiment, the encoder-decoder structure can be based on deep-learning technology, which can automatically generate problem statements from one or more health control descriptions from the system under test (for example, from the query component 110 and/or the content component 116).

In an embodiment, the query component 110, the content component 116, and/or the learning component 114 can work together or can exchange data and information and/or instructions, such that these components can optimize and accelerate the generation of problem descriptions from the query analytics. As will be further described below, the system can further include one or more feedback mechanisms (e.g., based on a user's input, where the user can include a technical architect) to optimize the classification of the user's queries to one or more key performance indicators (that is, one or more feedback mechanisms to optimize the mapping of the user's queries to one or more key performance indicators). In an embodiment, the feedback mechanism can use a form of active learning. In another embodiment, a second feedback mechanism can be used by the disclosed system (e.g., by the query component 110, the learning component 114, and the content component 116) to optimize the generation of problem descriptions, for example, using active learning. In various embodiments, the system can thereby generate problem descriptions in real time using operational data. Moreover, the system and its various components can provide a proactive health check of a system under test rather than a reactive technical health check that can lag the timing of the problems, and thereby provide real-time solutions for the system under test.

In an embodiment, the disclosed system (and its various components) can use one or more generated problem descriptions to recommend solutions to resolve such problems, for example, by searching a solution database or the Internet. Such solution databases can be provided on a database that can include a cloud-based environment, which is described further in connection with FIG. 7, below. In one or more embodiments, the disclosed system can be used in connection with bots and/or automated chat boxes that can automatically address a user's queries and/or questions and integrate them with operational insights derived from the problem descriptions and recommendations by the system. In another embodiment, the system (and its various components) can generalize the description of various problems' systems across other domains not related to technical health checks (for example, domains related to medical diagnostics, internet search queries, and the like). In an embodiment, the disclosed system can enable the prediction of outages, failures, and can thereby identify revenue loss risks based on the detection of a degradation of the one or more health checks and can provide a resulting problem description and corresponding solution to actively reduce the incidence of such scenarios.

The various components (e.g., the query component 110, the content component 116, and/or the learning component 114, and/or other components) can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed can be performed by specialized computers for carrying out defined tasks related to various types of neural networks in their particular context. The subject computer processing systems, methods apparatuses and/or computer program products can be employed to solve new problems that arise through advancements in technology, computer networks, the Internet and the like.

Embodiments of devices and systems (and their various components) described herein can employ artificial intelligence (AI) to facilitate automating one or more features described herein (e.g., generating problem descriptions from queries and/or technical health checks). The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, \ldots, z_n)$, to a confidence that the input belongs to a class, as by $f(z)=\text{confidence}(\text{class})$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

Figure 2:
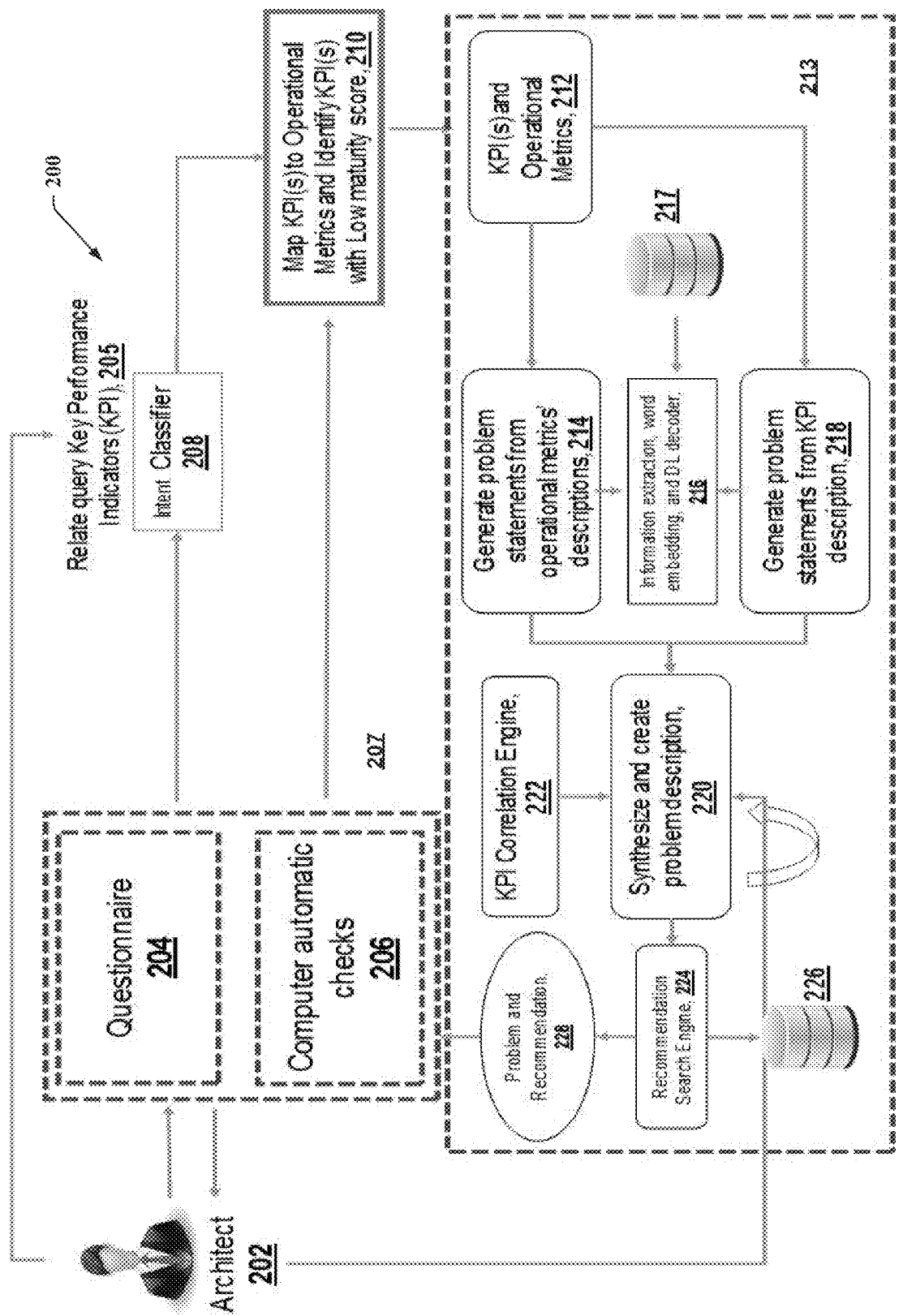
FIG. 2 depicts an example architecture for the system and apparatus disclosed herein, in accordance with one or more example embodiments described herein.

FIG. 2 shows an example architecture for the system and apparatus disclosed herein, in accordance with one or more example embodiments of the disclosure. In particular, diagram 200 shows an architect 202; the architect can include a user of a database, a server, or other equipment associated with a facility or company (for example, an enterprise network or server). In an embodiment, the architect 202 can interact with a technical health check component 207 (which can be part of the query component 110, described above in connection with FIG. 1). The technical health check component 207 can include at least one questionnaire 204 (to be filled out by the architect 202) or can include one or more automatic computer checks 206. In an embodiment, the questionnaire can include one or more inputs to the system from the architect 202 to provide a check of one or more operations of the system. In another embodiment, the system can provide automatic computer checks 206 of the performance of the system under test. Moreover, the automatic computer check 206 can be configured to perform similar, but not necessarily identical, technical checks of the performance of a given system, or some components of such a system as that provided by the architect 202.

In an embodiment, the results of a questionnaire 204 and/or the computer automatic checks 206 can be input to an intent classifier 208 (which can be part of the query component 110, described in connection with FIG. 1, above). The intent classifier 208 can classify the context or can classify the query originating from the questionnaire 204, or can classify the results of the computer automatic checks 206 to one or more contexts. In some aspects, the intent classifier 208 can include a supervised machine learning algorithm. For example, given previous queries and their respective classes (e.g. database, mainframe, and/or middleware classes), a supervised machine learning algorithm may be trained and used to classify a new query into the respective classes, for example, in order to better understand the context of the query. In one aspect, such a supervised machine learning algorithm may include a support vector machine (SVM) algorithm or similar algorithms, or a deep neural network algorithm such as a convolutional neural network. The context (for example, entities, categories, and/or topics) can be associated with the results of the query and/or the computer automatic checks 206.

In an embodiment, at block 205, the architect 202 can relate the query to one or more key performance indicators, or the computer can automatically relate the query to the key performance indicators. In another aspect, at 210, the output of the questionnaire 204 and/or the computer automatic checks 206 can be mapped to operational metrics, and the system can identify the key performance indicators that have a low maturity score, meaning that they are indicative of problems that can be occurring relatively quickly in time with respect to other system problems. For example, in one aspect, a look up table (or database) may be generated and used to map a given automated check to the operational metrics. In an embodiment, such key performance indicators (e.g., those having a low maturity score) can have increased urgency and can require a rapid reaction or solution to the problem to prevent additional maintenance and/or outages in the system. In another embodiment, the system can identify key performance indicators that have a particular urgency associated with them.

At block 212, the key performance indicators and/or operational metrics can be received by a computational block 213, which can be part of the learning component 114, described in connection with FIG. 1, above. In another aspect, the key performance indicators and operational parameters can be mapped by one another and can comprise a subset of the original key performance indicators having either a low maturity score or having a high urgency score.

At block 214, the system can generate problem statements from the operational metric description, which can be generated using one or more artificial intelligence techniques to be described further below.

At block 218, the system can generate problem statements from the key performance indicator descriptions. Moreover, a storage unit and/or a database 217 can be used to provide information extraction or embeddings and deep-learning decoding support (at block 216).

In an embodiment, the extracted information, the word embeddings, or the deep-learning decoding resulting from block 216 can be used in connection with operations of block 214 (for example, the generation of problem statements from operational metrics and/or descriptions). Additionally or alternatively, the information extraction or the embeddings and/or deep-learning decoding determined by block 216 can be used in connection with the operations of block 218 (e.g., in the generation of one or more problem statements from the key performance indicator descriptions). In an embodiment, the output of operational blocks 214 and/or 218 can be combined and used by the system, at block 220, to synthesize and/or create problem descriptions.

In an embodiment, at block 220, the architect 202 can provide feedback to better generate more accurate problem descriptions. In an embodiment, a key performance indicator correlation engine 222 (which can be part of the learning component 114, described in connection with FIG. 1, above) can provide input to the operations of block 220. In an embodiment, the key performance indicator correlation engine 222 can perform one or more correlations between a first subset of key performance indicators and a second subset of key performance indicators. In another embodiment, the key performance indicator correlation engine 222 can perform a correlation between one subset of key performance indicators and a subset of operational metrics. In a third embodiment, the key performance indicator correlation engine 222 can perform a correlation between a subset of operational metrics and another subset of operational metrics.

At block 224, the system can use a recommendation search engine to search for recommendations based on the synthesized problem description generated and created at block 220. In another aspect, the recommendation search engine can be part of the content component 116, described in connection with FIG. 1, above. At block 228, the problem description and solution recommendation can be generated and provided, for example, to a user, including the architect 202.

Figure 3:
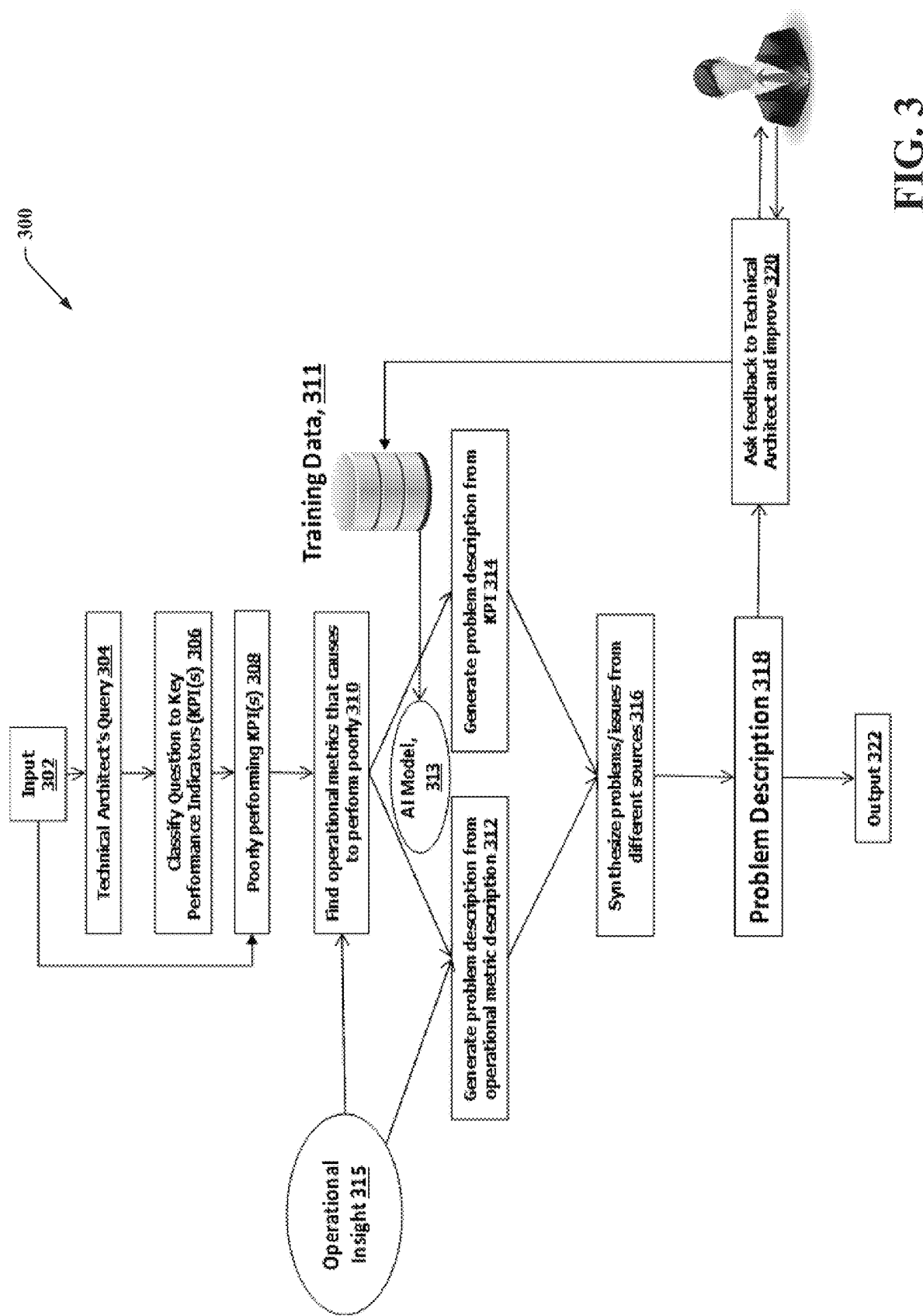
FIG. 3 depicts an example flow chart that describes aspects of the operation of the disclosed system, in accordance with one or more example embodiments described herein.

FIG. 3 shows an example flow chart that describes aspects of the operation of the disclosed system, in accordance with one or more example embodiments of the disclosure. At block 302, an input can be determined. In another aspect, the input can be determined at the query component 110, described in connection with FIG. 1, above. The input 302 can include a technical architect's query 304, for example, a query related to a poor performance of the system under test. In another embodiment (not shown), the input 302 can include the results from an automated health check performed by the system or the system under test. In an embodiment, the technical architect's query 304 can result from one or more inputs from the technical architect based on a problem with the system and/or a component of the system under test (for example, a reduced efficiency or operational capacity of the system under test).

At block 306, the system can classify the query and/or question and can determine one or more key performance indicators based on the query. In an embodiment, the classification can be performed using an intent classifier, which can be part of the query component 110, described in connection with FIG. 1, above. In another embodiment, the system can map the key performance indicators to one or more operational metrics. In an embodiment, the mapping of the key performance indicators and the operational metrics can be performed by one or more artificial intelligence algorithms or can be performed using a table or a similar search algorithm.

In an embodiment at block 308, the system can recognize one or more poorly performing key performance indicators. In an embodiment, the poorly performing key performance indicators can include a key performance indicator having a score below a predetermined threshold that can be programmed by either a technical architect or a user of the system (for example, a given key performance indicator indicative of the efficiency of memory operations of the system can perform at a reduced speed indicative of a poorly performing key performance indicator).

At block 310, the system can find one or more operational metrics that cause the system to perform poorly (e.g., operational parameters that are mapped to the key performance indicators determined in the previous operational blocks). In an aspect, the determination of search operational metrics can be performed by the system using any suitable computer-based search, including a search of one or more tables. In an aspect, one or more operational insights 315 can be used to inform the operational metrics at block 310. The operational insights 315 can be provided by previous iterations of the operational flow 300, or can be extracted from inputs by a technical architect or users of the system.

At block 312, an artificial intelligence (AI) model 313 can generate a problem description from operational metric descriptions. In one aspect, a supervised AI model may be used to generate the problem description. In particular, by using previous examples of operational metrics descriptions (or some other operational related description) and their mappings to problem descriptions, an AI-based neural network approach (e.g., an LSTM as shown and described in connection with FIG. 5 and related description) may be used to train the AI model for sequence-to-sequence learning. Such a model can be used to generate a problem description for a given new operational metric. Alternatively or additionally, an AI model 313 can generate problem descriptions from key performance indicators as shown in block 314. In another aspect, the AI model 313 can be part of the learning component 114, described in connection with FIG. 1, above. In an aspect, training data 311 can be used to train the AI model 313. The training data 311 can include data that has been previously determined and mapped to known key performance indicators having defined characteristics (e.g., key performance parameters that are poorly performing and mapped to known problem descriptions and/or technical architect queries). In another aspect, the training data represents a finite set of information that can be used to train the deep-learning model or other methods and/or artificial intelligence-based techniques implemented by the system. In another aspect, the training data can be stored on a database, for example, a database that is integrated into a cloud-computing environment, to be described further below.

At block 320, the system can ask for feedback from the technical architect to increase the quality of the training data 311. The technical architect can, for example, provide an evaluation (e.g., a score) corresponding to the accuracy of the model and training data 311. At block 316, the system can synthesize the problems and/or issues that are based on different sources (e.g., on a subset of key performance indicators, operational metrics, or the like). Alternatively or additionally, the system can synthesize the problems from different subcomponents of a system under test from various operational insights, from various key performance indicators, from various operational metrics, and/or from one or more operational metric descriptions.

At block 318, the system can output the final problem description and can request, at block 320, feedback from the technical architect in order to approve the quality of the problem description generated at block 318. In another aspect, the feedback can be incorporated into the content component 116, described in connection with FIG. 1, above. In another aspect, the feedback can be provided in the form of a questionnaire that can be displayed on a device such as a mobile device, and the technical architect can fill out the questionnaire. Further, at block 322, the system can provide an output to a user and/or a technical architect. For example, the system can provide a modified, simplified version of the problem description 318 that can be easily understood or understandable by a person.

Figure 4:
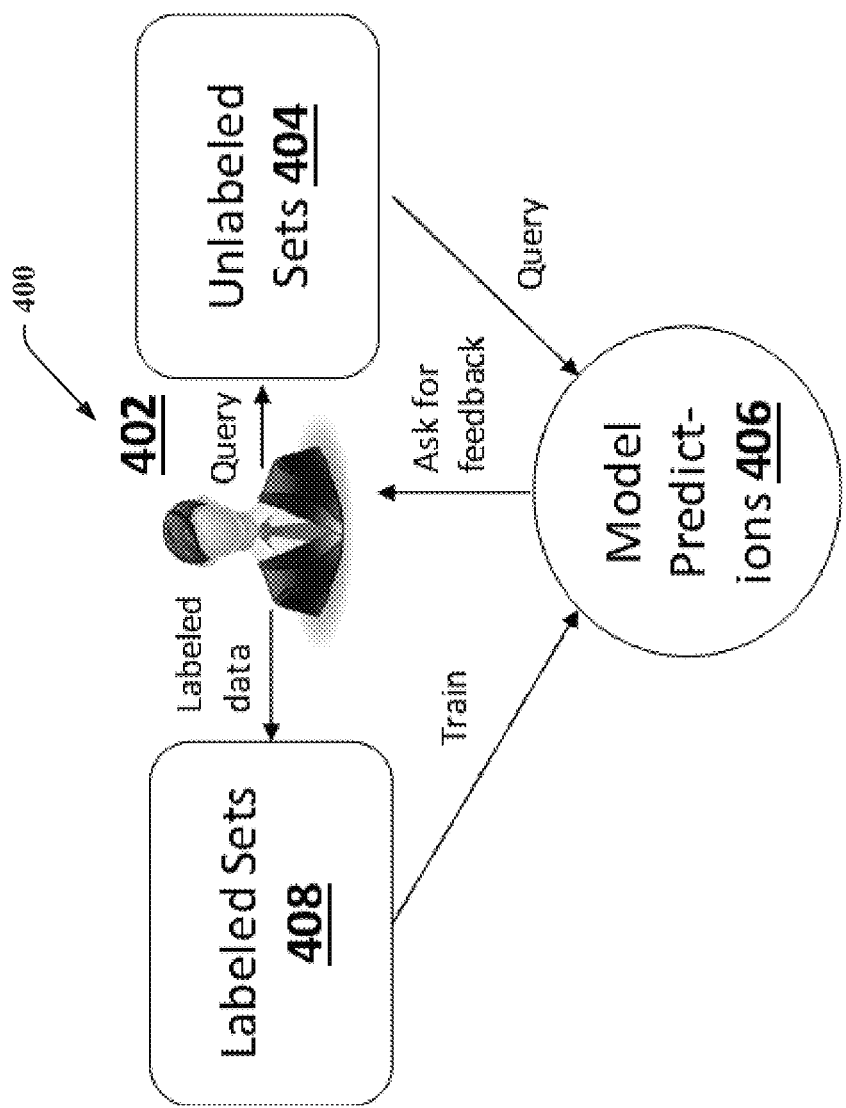
FIG. 4 depicts an example of diagram that depicts training aspects of the system and associated artificial intelligence methods, in accordance with one or more example embodiments described herein.

FIG. 4 shows an example of diagram 400 that depicts training aspects of the system and associated artificial intelligence methods, in accordance with one or more example embodiments of the disclosure. In an aspect, the training of the system and associated artificial intelligence methods can be performed as part of the learning component 114, described in connection with FIG. 1, above. At block 402, a user can provide labeled data and/or queries. In an embodiment, the labeled data can be used as input to one or more labeled sets 408. Labeled data can refer to data that has been previously classified and understood by the user and can therefore be used as a benchmark to train the artificial intelligence techniques (e.g., deep-learning neural networks or the like) used by the system. In another embodiment, the queries can be used as unlabeled sets, by the system at block 404. In another aspect, the unlabeled sets can be used to test the efficacy of the trained artificial intelligence techniques.

In particular, from a mathematical point of view, the learning component (e.g., the learning component 114, as described in connection with FIG. 1, above) can perform aspects of artificial intelligence training using a multilabel label classifier, as follows. In an embodiment, the labeled set described above can be represented by $D_1$. In an embodiment, the system can train a multilabel label classifier, $F_1$, based on the training data $D_1$. In an embodiment, the system can predict, via model prediction component 406, labels $L_1$, $L_2 \ldots L_n$ that correspond to a given user inquiry. In an embodiment, the system can then ask a user to validate the generated labels $L_1, L_2 \ldots L_n$ for a given query cue. In an embodiment, the system can update the training data $D_1$ with the user query cue and additional labels $L_i, L_j \ldots L_k$. In an embodiment, the system can retrain a multi-label classifier $F_i$ using the training data $D_i$.

Figure 5:
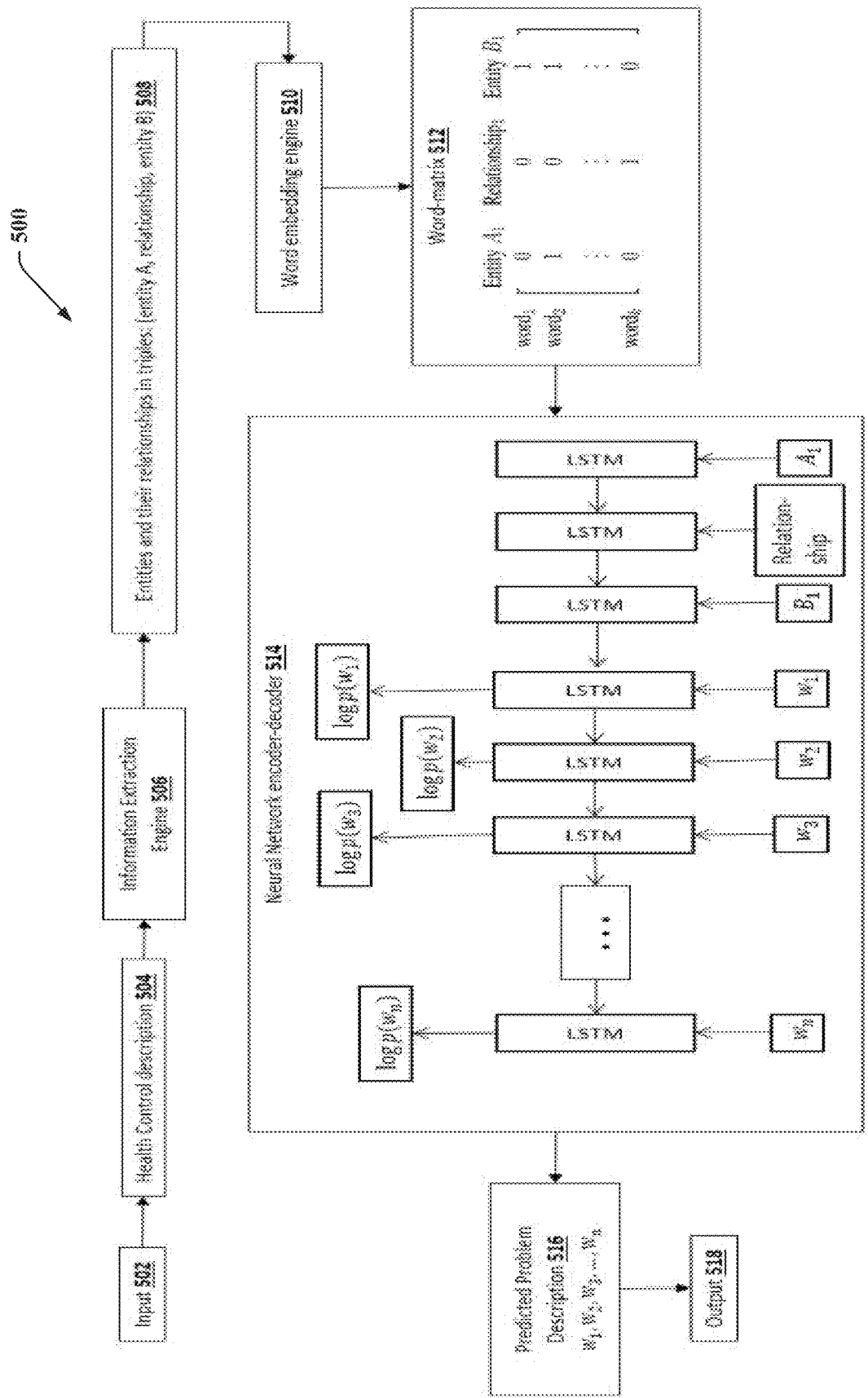
FIG. 5 depicts an example diagram that represents a deep-learning algorithm component of for use in connection with the artificial algorithms described herein, in accordance with one or more example embodiments described herein.

FIG. 5 shows an example diagram 500 that represents a deep-learning algorithm component for use in connection with the artificial algorithms described herein, in accordance with one or more example embodiments of disclosure. At block 502, inputs can be provided to the system (e.g., at the query component 110, described in connection with FIG. 1, above), including a health control description 504. In an alternative embodiment (not shown), the input 502 can include queries from a user (such as a technical architect), as variously described above. Moreover, the health control description 504 can be generated automatically using one or more computer-automated techniques implementing artificial intelligence and/or can be generated manually (e.g., by a user filling, for example, questionnaires or via other forms of input 502 generated by the user).

At block 506, the system can extract information by an information extraction engine 506 (e.g., at the query component 110, described in connection with FIG. 1, above), from the health control description 504, or from other input 502 (e.g., user inputs from a questionnaire). At block 508, the system can generate (e.g., at the query component 110, described in connection with FIG. 1, above) entities and relationships in triplet pairs: a triplet including an entity A, a relationship, and an entity B. In an embodiment, entity A can include a first component of a system (e.g., a memory block). In another aspect, entity B can include an associated description of entity A or a parameter associated with entity A (e.g., memory rates, read/write rates, and the like). In another embodiment, the relationship relating entity A with entity B can include a description such as "reduce," "increase," or the like. Accordingly, the system can generate a description of a rudimentary relationship between entity A and entity B. In the cited example, the system can generate a description that a "memory block has a reduced read rate."

At block 510, a word-embedding engine can be used to generate a word matrix 512. In an embodiment, the word matrix 512 can represent a matrix of words (e.g., word 1, word 2, . . . , word k) in various rows of the matrix, along with various entities (e.g., entity A1), relationships (e.g., relationship 1), and entities (e.g., entity B1) as the columns of the word matrix 512. The word matrix 512 can thereby capture various word embeddings represented in the query and/or the health control descriptions. In some aspects, the operations of block 510 can be performed at the learning component 114, described in connection with FIG. 1, above.

In an aspect, the output of the word matrix 512 can be fed into a neural network decoder 514 (e.g., performed at the learning component 114, described in connection with FIG. 1, above). The neural network decoder 514 can parse the words (for example, word 1, word 2, word 3 . . . word N, represented by $w_1, w_2, w_3 \ldots w_n$). Further, the neural network decoder 514 can use a deep-learning algorithm to determine the probability of a given word following another word (for example, the neural network decoder 514 can use deep-learning to determine the probability that a word 2 (e.g., $w_2$) follows word 2 (e.g., $w_1$) in a description corresponding to user generated inquiry or a technical health check. In an embodiment, the words (e.g., $w_1, w_2, w_3 \ldots w_n$) can be inputted to long short-term memory (LSTM) blocks, which can compute the natural logarithm of the probability of the n-th word, that is, log $p(w_n)$, as part of the computations of the neural network decoder 514.

In an embodiment, the output of a first LSTM block (e.g., a first LSTM block corresponding to entity A1) may be sequentially inputted to a subsequent LSTM block (e.g., a second LSTM block corresponding to the relationship), whose output may in turn be inputted to another LSTM block (e.g., a third LSTM block corresponding to another entity B1). In another aspect, the output of the LSTM block corresponding to the entity B1 may be inputted to a subsequent LSTM block (e.g., a first LSTM block corresponding to word 1, $w_1$), whose output can be sequentially inputted to a subsequent LSTM block (e.g., a second LSTM block corresponding to word 2, $w_2$), which can perform a similar operation, until the sequence of words represented in the word matrix 512 is complete. In one aspect, the process described above may comprise a log probability (e.g., log likelihood) for the i-th word ($w_i$) that corresponds to log $p(w_i)$=log $p(w_1, w_2, \ldots, w_i |$(Entity A, Relationship, Entity$_B$)).

In an embodiment, the output of the neural network decoder 514 can include a predicted problem description 516, which can include a sequence of predicted words (e.g., $w_1, w_2, w_3 \ldots w_n$). The predicted words from the neural network decoder 518 can thereby represent the AI-algorithms predicted problem description that corresponds to the user's inquiry or results of the technical health checks that were originally inputted at block 502. In an embodiment, the predicted problem description 516 can be outputted (e.g., at block 518, for example, to a user at a user display at a device (e.g., a mobile device) associated with the user (e.g., a technical architect).

Figure 6:
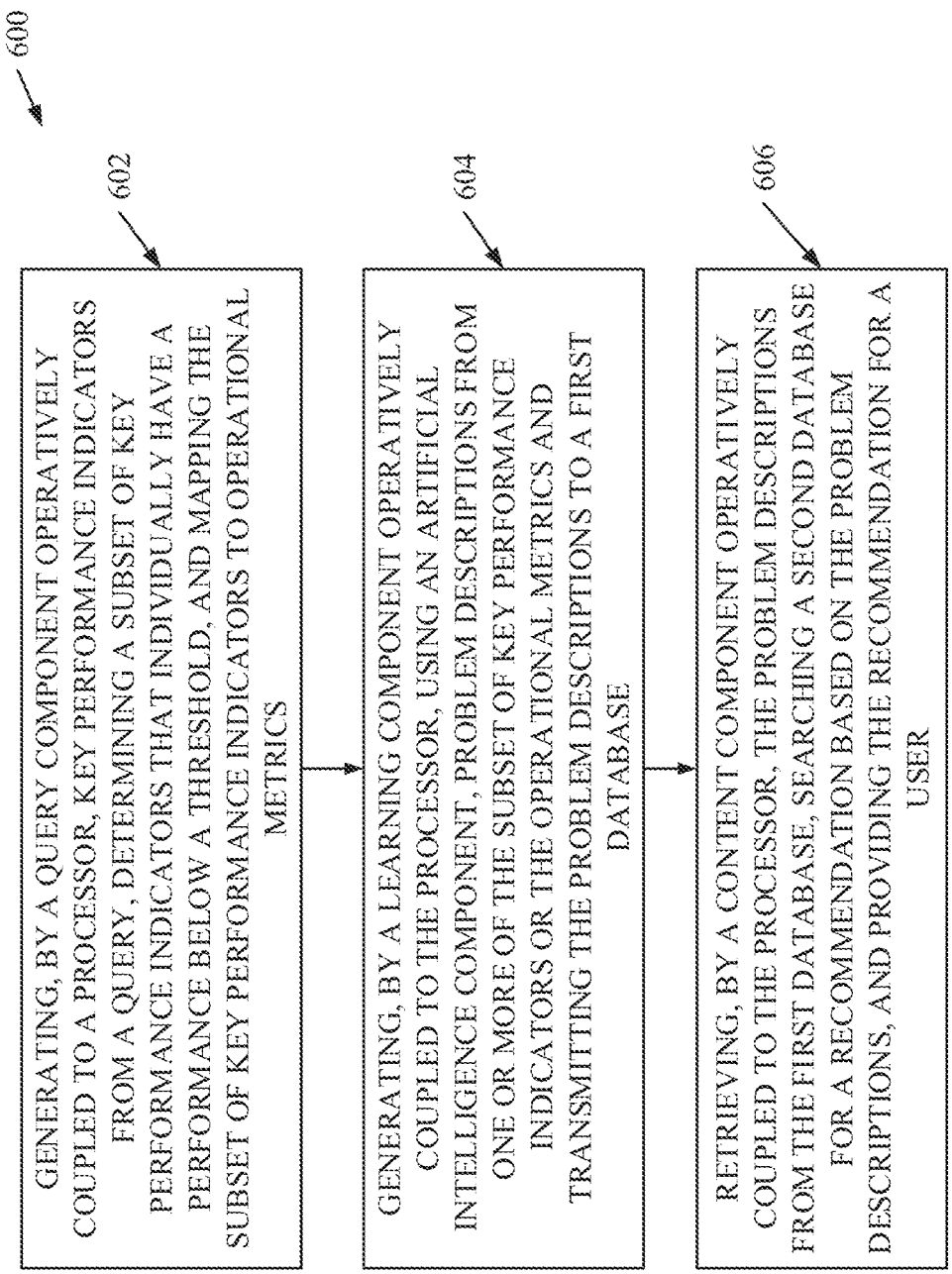
FIG. 6 depicts a diagram of an example flowchart for operating aspects of the artificial intelligence based systems and algorithms used to provide problem descriptions, in accordance with one or more example embodiments described herein.

FIG. 6 shows a flow chart of one or more operations for the disclosed system, in accordance with one or more example embodiments of the disclosure. At block 602, a query component operatively coupled to a processor can generate key performance indicators from a query. Further, the query component can determine a subset of key performance indicators that individually have a performance below a threshold. Further, the query component can map the subset of key performance indicators to operational metrics.

At block 604, a learning component operatively coupled to a processor can generate, using artificial intelligence, problem descriptions from one or more of the subset of key performance indicators or operational metrics. Further, the learning component can transmit the problem descriptions to a first database.

At block 606, a content component operatively coupled to the processor can retrieve the problem descriptions from the first database. Further, the content component can search a second database for a recommendation based on the problem descriptions. Finally, the content component can provide a recommendation based on the generated problem description to a user (for example, at a user device display).

As mentioned, one or more databases used in connection with the disclosure can include a database stored or hosted on a cloud computing platform. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
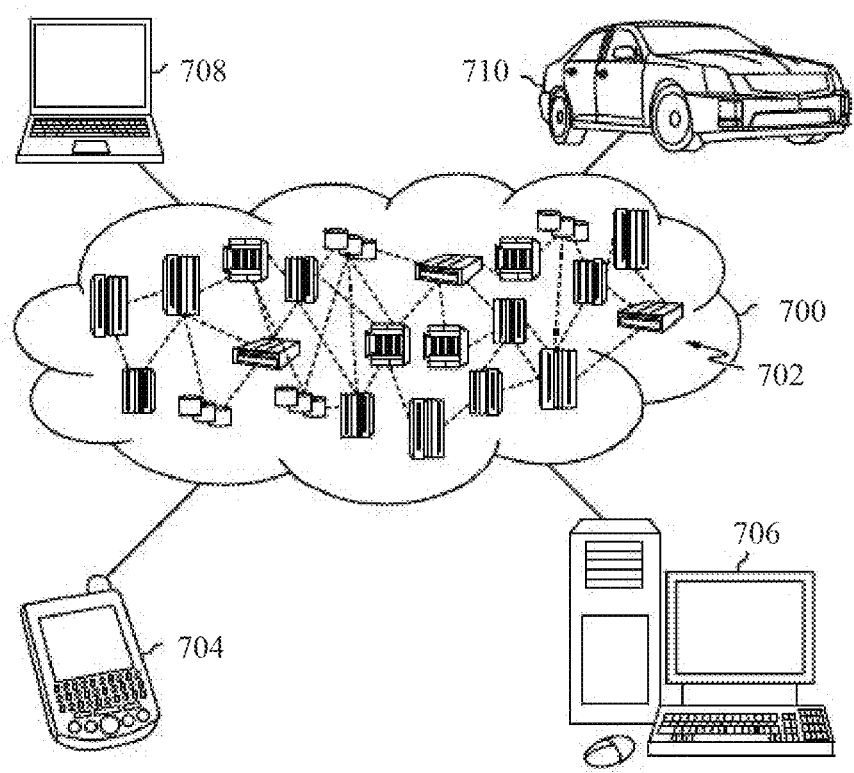
FIG. 7 depicts a cloud computing environment, in accordance with one or more embodiments described herein.

Referring now to FIG. 7, illustrative cloud computing environment 700 is depicted. Repetitive description of like elements employed in other embodiments described herein is omitted for sake of brevity. As shown, cloud computing environment 700 includes one or more cloud computing nodes 702 with which local computing devices used by cloud consumers, such as, for example, personal digital assistant (PDA) or cellular telephone 704, desktop computer 706, laptop computer 708, and/or automobile computer system 710 can communicate. Nodes 702 can communicate with one another. They can be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704-710 shown in FIG. 7 are intended to be illustrative only and that computing nodes 702 and cloud computing environment 700 can communicate with any type of computerized device over any type of network and/or network addressable connection (e.g., using a web browser).

Figure 8:
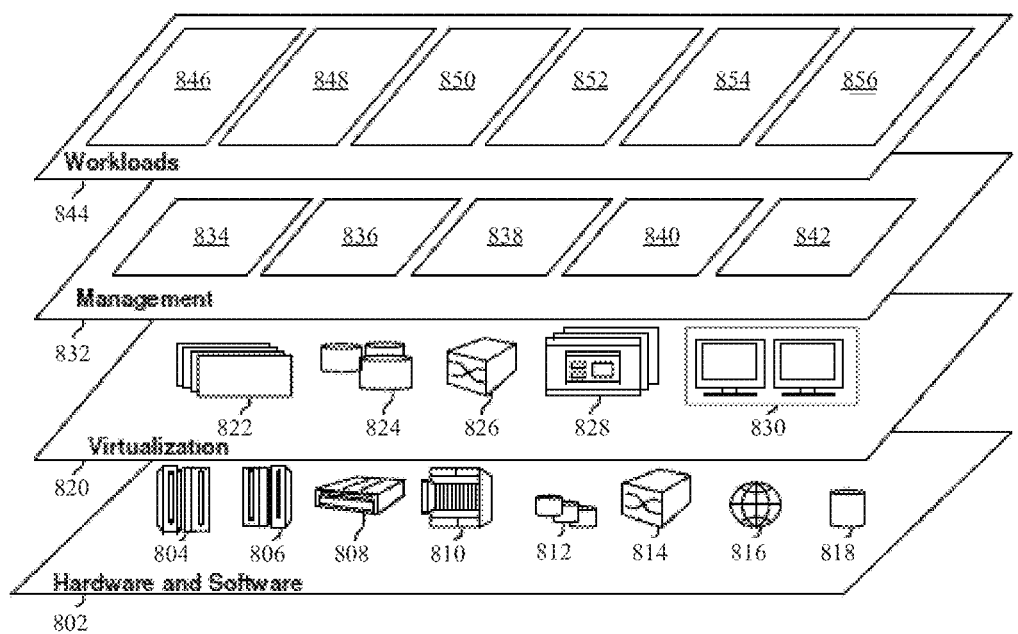
FIG. 8 depicts abstraction model layers, in accordance with one or more embodiments described herein.

Referring now to FIG. 8, a set of functional abstraction layers provided by cloud computing environment 700 (FIG. 7) is shown. Repetitive description of like elements employed in other embodiments described herein is omitted for sake of brevity. It should be understood in advance that the components, layers, and functions shown in FIG. 7 are intended to be illustrative only and embodiments of the invention are not limited thereto. As depicted, the following layers and corresponding functions are provided.

Hardware and software layer 802 includes hardware and software components. Examples of hardware components include: mainframes 804; RISC (Reduced Instruction Set Computer) architecture-based servers 806; servers 808; blade servers 810; storage devices 812; and networks and networking components 814. In some embodiments, software components include network application server software 816 and database software 818.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 832 can provide the functions described below. Resource provisioning 834 provides dynamic procurement of computing resources and other resources that are utilized to perform tasks within the cloud computing environment. Metering and Pricing 836 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provide pre-arrangement for, and procurement of, cloud computing resources for which a future requirement is anticipated in accordance with an SLA.

Workloads layer 844 provides examples of functionality for which the cloud computing environment can be utilized. Examples of workloads and functions which can be provided from this layer include: mapping and navigation 846; software development and lifecycle management 848; virtual classroom education delivery 850; data analytics processing 852; transaction processing 854; and assessing an entity's susceptibility to a treatment service 856. Various embodiments of the present invention can utilize the cloud computing environment described with reference to FIGS. 7 and 8 to determine problem descriptions based on training data and/or databases associated with key performance indicators or operational metrics as variously described herein.

The present invention can be a system, a method, and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 9:
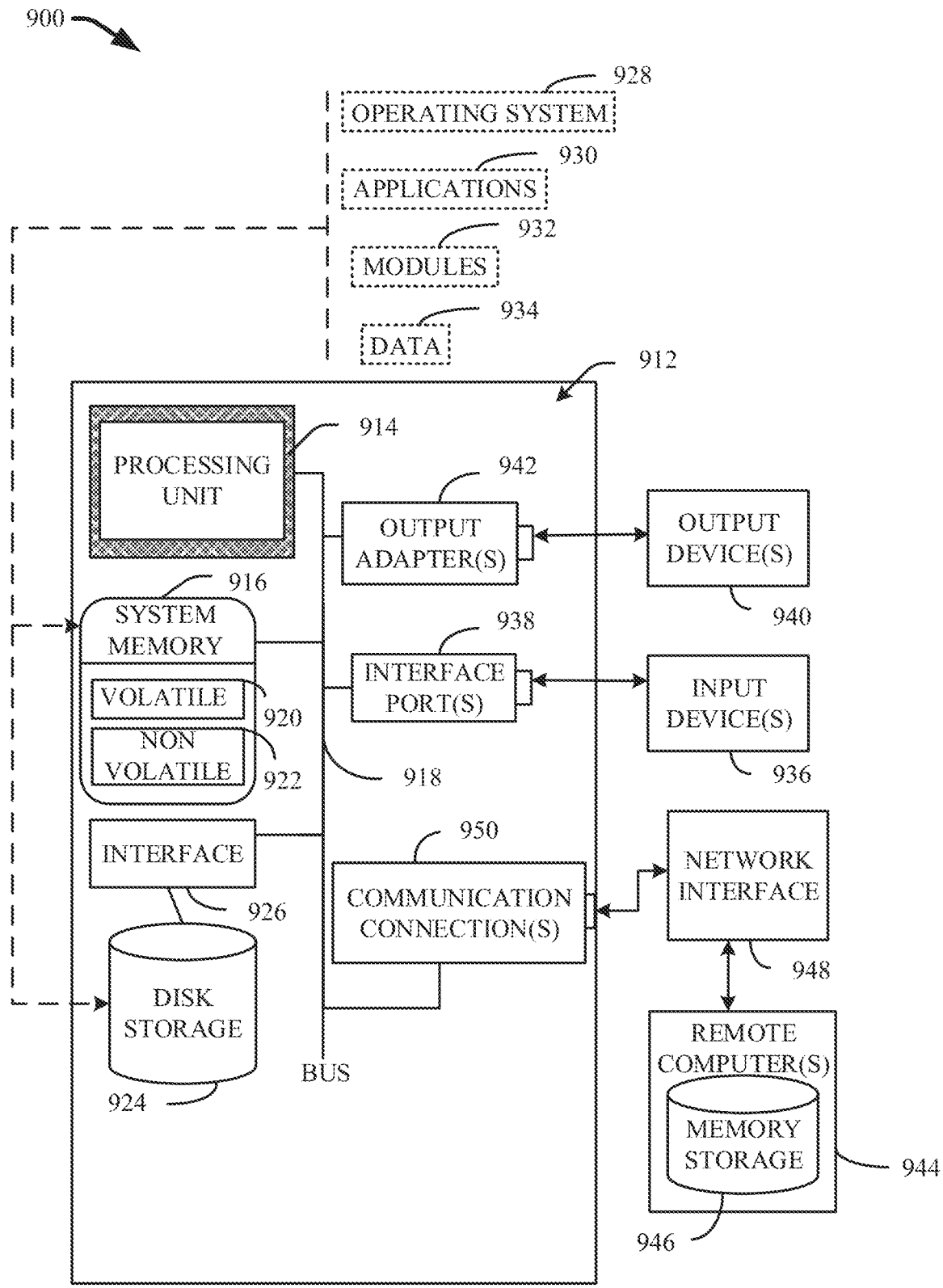
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity. With reference to FIG. 9, a suitable operating environment 900 for implementing various aspects of this disclosure can include a computer 912. The computer 912 can also include a processing unit 914, a system memory 916, and a system bus 918. The system bus 918 can operably couple system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, can be stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface can be used, such as interface 926. FIG. 9 also depicts software that can act as an intermediary between users and the basic computer resources described in the suitable operating environment 900. Such software can also include, for example, an operating system 928. Operating system 928, which can be stored on disk storage 924, acts to control and allocate resources of the computer 912. System applications 930 can take advantage of the management of resources by operating system 928 through program components 932 and program data 934, e.g., stored either in system memory 916 or on disk storage 924. It is to be appreciated that this disclosure can be implemented with various operating systems or combinations of operating systems. A user enters commands or information into the computer 912 through one or more input devices 936. Input devices 936 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 914 through the system bus 918 via one or more interface ports 938. The one or more Interface ports 938 can include, for example, a serial port, a parallel port, a game port, and a universal serial bus (USB). One or more output devices 940 can use some of the same type of ports as input device 936. Thus, for example, a USB port can be used to provide input to computer 912, and to output information from computer 912 to an output device 940. Output adapter 942 can be provided to illustrate that there are some output devices 940 like monitors, speakers, and printers, among other output devices 940, which require special adapters. The output adapters 942 can include, by way of illustration and not limitation, video and sound cards that provide a means of connection between the output device 940 and the system bus 918. It should be noted that other devices and/or systems of devices provide both input and output capabilities such as one or more remote computers 944.

Computer 912 can operate in a networked environment using logical connections to one or more remote computers, such as remote computer 944. The remote computer 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer 944. Remote computer 944 can be logically connected to computer 912 through a network interface 948 and then physically connected via communication connection 950. Further, operation can be distributed across multiple (local and remote) systems. Network interface 948 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, component, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules or components. Generally, program modules or components include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, minicomputing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules or components can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components;
   a processor, operably coupled to the memory, and that executes the compute r-executable components stored in the memory, wherein the computer-executable components comprise:
      a query component that generates key performance indicators and maturity scores from a query, wherein a maturity score is an indicator of a position in time that a problem related to a key performance indicator occurs such that a low maturity score is indicative of the problem occurring prior to and having increased urgency than a second problem in time, and wherein the query component determines a subset of key performance indicators that individually have a performance below a threshold and maps the subset of key performance indicators to operational metrics;
      a learning component that generates, using artificial intelligence, problem descriptions from one or more of the subset of key performance indicators or the operational metrics by computing a correlation between the subset of key performance indicators and the operational metrics and transmits the problem descriptions to a first database, wherein the problem descriptions comprise identification of risks based on prediction of outages or failures in at least an electronic device; and
      a content component that retrieves the problem descriptions from the first database, searches a second database for a recommendation based on the problem descriptions, and provides the recommendation for an entity;
   wherein the query component further generates a context description from the key performance indicators and the learning component uses the context description to train the artificial intelligence.

2. The system of claim 1, wherein the learning component further generates the problem descriptions by computing a correlation between at least one of: a first portion of the subset of key performance indicators and a second portion of the subset of key performance indicators; or a portion of the operational metrics and a second portion of the operational metrics.

3. The system of claim 1, wherein the context description is one or more of an entity, a category, or a topic associated with the query.

4. The system of claim 1, wherein the artificial intelligence includes a recurrent neural network.

5. The system of claim 4, wherein the recurrent neural network comprises a long-short term memory neural network.

6. The system of claim 1, wherein the query component computes key performance indicators by classifying the query using a multi-label classifier.

7. The system of claim 6, wherein a user trains the multi-label classifier by validating labels predicted by the multi-label classifier for training data comprising labeled queries and unlabeled queries.

8. The system of claim 1, wherein a user provides feedback associated with the problem descriptions to the learning component, and the learning component uses the feedback to train the artificial intelligence.

9. A computer-implemented method, comprising:
generating, by a query component operatively coupled to a processor, key performance indicators and maturity scores from a query, wherein a maturity score is an indicator of a position in time that a problem related to a key performance indicator occurs such that a low maturity score is indicative of the problem occurring prior to and having increased urgency than a second problem in time, determining a subset of key performance indicators that individually have a performance below a threshold, and mapping the subset of key performance indicators to operational metrics;
generating, by a learning component operatively coupled to the processor, using artificial intelligence, problem descriptions from one or more of the subset of key performance indicators or the operational metrics by computing a correlation between the subset of key performance indicators and the operational metrics and transmitting the problem descriptions to a first database, wherein the problem descriptions comprise identification of risks based on prediction of outages or failures in at least an electronic device;
retrieving, by a content component operatively coupled to the processor, the problem descriptions from the first database, searching a second database for a recommendation based on the problem descriptions, and providing the recommendation for an entity; and
generating, by the query component, a context description from the key performance indicators and training, by the learning component, the artificial intelligence using the context description.

10. The computer-implemented method of claim 9, wherein the artificial intelligence includes a recurrent neural network.

11. The computer-implemented method of claim 10, wherein the recurrent neural network comprises a long-short term memory neural network.

12. The computer-implemented method of claim 9, wherein the query component computes the key performance indicators by classifying the query using a multi-label classifier.

13. The computer-implemented method of claim 12, wherein the multi-label classifier is trained by a user by validating labels predicted by the multi-label classifier for training data comprising labeled queries and unlabeled queries.

14. A computer program product for automated problem generation using artificial intelligence, comprising a non-transitory computer readable storage medium having program instructions embodied therewith, the program instructions executable by a processor to cause the processor to:
generate, by the processor, key performance indicators and maturity scores from a query, wherein a maturity score is an indicator of a position in time that a problem related to a key performance indicator occurs such that a low maturity score is indicative of the problem occurring prior to and having increased urgency than a second problem in time, determine a subset of key performance indicators that individually have a performance below a threshold, and map the subset of key performance indicators to operational metrics;
generate, by the processor, using artificial intelligence, problem descriptions from one or more of the subset of key performance indicators or the operational metrics by computing a correlation between the subset of key performance indicators and the operational metrics and transmit the problem descriptions to a first database, wherein the problem descriptions comprise identification of risks based on prediction of outages or failures in at least an electronic device;
retrieve, by the processor, the problem descriptions from the first database, search a second database for a recommendation based on the problem descriptions, and provide the recommendation for an entity; and
generate, by the processor, a context description from the key performance indicators and use the context description to train the artificial intelligence.

15. The computer program product of claim 14, wherein the artificial intelligence includes a recurrent neural network.

16. The computer program product of claim 15, wherein the recurrent neural network comprises a long-short term memory neural network.

17. The computer program product of claim 14, wherein the program instructions further cause the processor to compute the key performance indicators by classifying the query using a multi-label classifier.

18. A system, comprising:
a memory that stores computer-executable components;
a processor, operably coupled to the memory, and that executes the compute r-executable components stored in the memory, wherein the computer-executable components comprise:
a query component that generates key performance indicators and maturity scores from a query, wherein a maturity score is an indicator of a position in time that a problem related to a key performance indicator occurs such that a low maturity score is indicative of the problem occurring prior to and having increased urgency than a second problem in time, determines a subset of the key performance indicators, and maps the subset of the key performance indicators to operational metrics;
a learning component that generates, using artificial intelligence, problem descriptions from one or more of the subset of the key performance indicators or the operational metrics by computing a correlation between the subset of key performance indicators and the operational metrics, wherein the problem descriptions comprise identification of risks based on prediction of outages or failures in at least an electronic device; and
a content component that retrieves the problem descriptions and searches a database for a recommendation based on the problem descriptions;
wherein the query component further generates a context description from the key performance indicators and the learning component uses the context description to train the artificial intelligence.

19. The system of claim 18, wherein the artificial intelligence includes a recurrent neural network, the recurrent neural network comprising a long-short term memory neural network.

20. The system of claim 18, wherein the query component computes the key performance indicators by classifying the query using a multi-label classifier.

21. A computer-implemented method, comprising:
generating, by a query component operatively coupled to a processor, key performance indicators and maturity scores from a query, wherein a maturity score is an indicator of a position in time that a problem related to a key performance indicator occurs such that a low maturity score is indicative of the problem occurring prior to and having increased urgency than a second problem in time, determining a subset of the key performance indicator, and mapping the subset of the key performance indicators to operational metrics;

generating, by a learning component operatively coupled to the processor and using artificial intelligence, problem descriptions from one or more of the key performance indicators or the operational metrics by computing a correlation between the subset of key performance indicators and the operational metrics, wherein the problem descriptions comprise identification of risks based on prediction of outages or failures in at least an electronic device;

retrieving, by a content component operatively coupled to the processor, the problem descriptions and searching a database for a recommendation based on the problem descriptions; and generating, by the query component, a context description from the key performance indicators and training, by the learning component, the artificial intelligence using the context description.

22. The computer-implemented method of claim 21, wherein the computer-implemented method further includes computing, by the query component, the key performance indicators by classifying the query using a multi-label classifier.

* * * * *